UNITED STATES PATENT OFFICE 2,628,236

5-BENZYL- 2,4 -DIAMINO- 6 -ALKYLPYRIMI-DINES AND METHOD OF MAKING THE SAME

George H. Hitchings, Tuckahoe, and Elvira A. Falco, New Rochelle, N. Y., assignors to Burroughs Wellcome & Co. (U. S. A.) Inc., Tuckahoe, N. Y., a corporation of New York No Drawing. Application December 23, 1949, Serial No. 134,866

3 Claims. (Cl. 260—256.4)

The present invention relates to new pyrimidine derivatives, and is based on the discovery that certain 2,4-diaminopyrimidine derivatives containing benzyl constituents at position 5 and alkyl groups at position 6 of the pyrimidine ring have valuable therapeutic properties. These substances inhibit the growth of certain microorganisms, including bacteria and protozoa, in a manner similar to that outlined in our cognate application #74,462 with regard to 5-aryloxy-pyrimidines. For certain purposes the present compositions are even more potent than those described in the copending application.

The compositions contemplated by the present invention may be represented as substituted pyrimidines of the formula

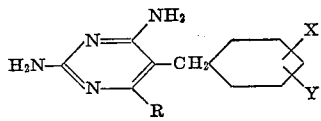

wherein R constitutes a radical selected from the class consisting of an alkyl radical containing not over 3 carbon atoms, and X and Y are members of the class consisting of hydrogen, halogen, alkyl and alkoxyl radicals; and X and Y together may constitute a methylene dioxy group.

The process of the present invention may involve the initial preparation of an alpha-benzyl-beta-ketoester. This may be carried out by the reaction of an appropriate benzylchloride with the sodium derivative of the beta-ketoester as in the presence of sodium alcoholate. The selected benzyl ester then is condensed with guanidine in the usual way to form the 2-amino-4-hydroxy-pyrimidine derivative which then is chlorinated and aminated to give the desired 2,4-diamino-5-benzyl-6 alkylpyrimidine. Alternatively, the condensation product with guanidine may be treated by the method of Hitchings and Elion as set forth in U. S. Patent No. 2,451,793 to form the 2-amino-4-thiolpyrimidine and the product in turn treated with ammonia to yield the diamino derivative.

The following examples may serve to illustrate the methods used in preparing the compounds according to the present invention but are not intended in any way to limit the invention, the scope of which is defined in the claims.

EXAMPLE 1

*2,4-diamino-5-p-chlorobenzyl-6-methylpyrimidine*

A solution of 23 g. of sodium in 300 ml. of absolute ethanol was prepared and to this was added 130 g. of ethylacetoacetate. After cooling at 30°, 161 g. of p-chloro-benzylchloride was added, the solution was allowed to stand 1 hour and was then refluxed 1 hour on the steam bath. The sodium chloride which had been formed was removed by filtration and 108 g. of the alpha-p-chlorobenzylacetoacetic ester was isolated by distillation in vacuo boiling at 197° 15–20 mm.

The above ester (57 g.) was dissolved in 1 liter of absolute alcohol, 22 g. of guanidine carbonate was added and the mixture refluxed for 5 hours. The reaction mixture was poured into 2 liters of water, neutralized with acetic acid and the 2-amino-4-hydroxy-5-p-chloro benzyl-pyrimidine was obtained by filtration. After purification by solution in aqueous alkali and precipitation by acid the yield was 40 g.

The amino-hydroxypyrimidine from the previous reaction (15 g.) was refluxed with phosphorus oxychloride (100 ml.) for 30 minutes. After removal of the excess phosphorylchloride by distillation in vacuo, the residue was poured over ice and the mixture was made slightly alkaline with ammonia. The 2-amino-4-chloropyrimidine was removed by filtration, transferred to a bomb and heated at 155–60° for 16 hours with 100 ml. of an alcoholic solution which had been saturated with ammonia gas at 0–5°. The contents of the bomb were evaporated to dryness and the solid was leached with 25 ml. of 2N sodium hydroxide solution. The solid was purified by solution in dilute aqueous hydrochloric acid and precipitation with sodium hydroxide. After two such recrystallizations there remained 8.75 g. of colorless needles melting at 235–6°

EXAMPLE 2

*2,4-diamino-5-p-bromobenzyl-6-methylpyrimidine*

The method of Example 1 was employed to produce 2,4 - diamino-5-p-bromobenzyl-6-methylpyrimidine in the form of needles melting at 239–41°.

EXAMPLE 3

*2,4-diamino-5-o-chlorobenzyl-6-methylpyrimidine*

The method of Example 1 was employed to produce 2,4-diamino-5-o-chlorobenzyl-6-methylpyrimidine. This was obtained as needles melting at 228°. By a similar method 2,4-diamino-5-m-chlorobenzyl-6-methylpyrimidine was prepared.

EXAMPLE 4

*2,4-diamino-5-(2',4'-dichlorobenzyl)-6-methylpyrimidine*

Ethyl alpha-(2,4-dichlorobenzyl)-acetoacetate was prepared as described above for the p-chlorobenzylacetoacetic ester, and condensed with guanidine carbonate to give 2-amino-4-hydroxy-5-(2',4'-dichlorobenzyl)-6-methylpyrimidine. The aminohydroxypyrimidine (16 g.) was refluxed with an excess (100 ml.) of phosphorylchloride for 25 minutes, the excess phosphorylchloride removed by distillation in vacuo and the residue poured over ice. After adding an excess of ammonia the 2-amino-4-chloro-5-(2',4'-dichlorobenzyl)-6-methylpyrimidine was filtered off and transferred to a bomb. After the addition of 100 ml. of alcoholic ammonia solution (saturated at 0–5°) the bomb was sealed and heated at 160° for 14.5 hours. The product, 2,4-diamino-5-(2',4'-dichlorobenzyl)-6-methylpyrimidine isolated and purified by the methods illustrated in Example 1, melts at 244–5° after softening at 238°.

The same procedure was followed in preparing 2,4-diamino-5-(3',4'-dichlorobenzyl)-6-methylpyrimidine and 2,4-diamino-5-(2',6'-dichlorobenzyl)-6-methylpyrimidine.

EXAMPLE 5

2,4-diamino-5-p-chlorobenzyl-6-n-propylpyrimidine

Ethyl-alpha-p-chlorobenzyl-beta-ketocaproic acid was prepared from p-chlorobenzylchloride and the sodium derivative of ethylbutyroacetate. The mixture was suspended in benzene and allowed to stand overnight, then warmed under reflux for one hour. The ester was isolated by distillation and condensed with guanidine carbonate and the 2-amino-4-hydroxy-5-p-chlorobenzyl-6-propylpyrimidine was chlorinated and aminated substantially as in the previous examples. 2,4-diamino-5-p-chlorobenzyl-6-propylpyrimidine was isolated as colorless crystals melting at 214–6°.

EXAMPLE 6

2,4-diamino-5-benzyl-6-methylpyrimidine

A solution of 11.5 g. of sodium (0.5 atom) in 150 ml. of absolute ethanol was mixed with 130 g. ethyl aceto-acetate. After cooling to 30°, 63.6 g. of benzyl chloride (0.5 m.) was added. The reaction mixture was refluxed for 1 hour after standing for 1 hour and the desired ethyl alpha-benzyl-aceto-acetate was isolated by filtration, evaporation and distillation as before. This illustrates the use of an excess of beta-ketoester which is sometimes advantageous in minimizing the formation of the alpha-alpha-dibenzyl ester.

The alpha-benzylacetoacetic ester was condensed with an alcoholic solution of guanidine (prepared from guanidine hydrochloride and sodium ethoxide) and the 2-amino-4-hydroxy-5-benzyl-6-methylpyrimidine was isolated as in the examples above.

The aminohydroxypyrimidine (13.1 g.) was chlorinated with an excess of phosphorus oxychloride (100 ml). The 2-amino-4-chloro-derivative was separated from the excess phosphorylchloride and aminated by the procedure described above. The diamino compound was purified by solution in dilute aqueous hydrochloric acid followed by filtration and treatment with an excess of sodium hydroxide solution to produce a yield of 6.6 g. in the form of colorless needles melting at 181–5°.

EXAMPLE 7

2,4-diamino-5-(3',4'-methylenedioxybenzyl)-6-methylpyrimidine

Ethyl alpha-piperonylacetoacetate was prepared from piperonyl bromide and acetoacetic ester, by the procedure described in Example 5, and condensed with guanidine carbonate to give 2-amino-4-hydroxy-5-piperonyl-6-methylpyrimidine. Chlorination and amination gave 2,4-diamino-5-piperonyl-6-methylpyrimidine as colorless needles decomposing without melting at 273°.

EXAMPLE 8

2,4-diamino-5-(m-methylbenzyl)-6-methylpyrimidine 2,4-diamino-5-(m-methylbenzyl)-6-methylpyrimidine was prepared by the method of Example 7 and crystallized as colorless plates from 30 percent aqueous ethanol melting at 162–3°.

EXAMPLE 9

2,4-diamino-5-(ethylbromobenzyl)-6-methylpyrimidine

Ethyl alpha-(ethylbromobenzyl)-acetoacetate was prepared from ethylacetoacetate and the mixture of ethylbromobenzylchlorides which was obtained by the chloromethylation of p-ethylbromobenzene. This ester was condensed with guanidine to give the aminohydroxypyrimidine, which was chlorinated and aminated. The resulting diaminopyrimidine is regarded as substantially a mixture of 2,4-diamino-5-(2'-bromo-5'-ethylbenzyl)-6-methylpyrimidine and 2,4-diamino-5-(2'-ethyl-5'-bromobenzyl)-6-methylpyrimidine and may be used as such without separation of the isomers.

Similarly, ethyl α-(methylbromobenzyl) acetoacetate was prepared from sodium acetoacetic ester and the mixture of methylbromobenzyl bromides afforded by side chain bromination of 2-bromo-1,4-dimethylbenzene. This ester was condensed with guanidine and after the sequence of reactions described in Example 1 afforded a mixture of isomeric 2,4-diamino-6-methyl-5-(methylbromobenzyl) pyrimidines melting from 183° to 189° C.

EXAMPLE 10

2,4-diamino-5-(3'-methoxy, 4'-hydroxybenzyl)-6-methylpyrimidine

Ethyl α-4-hydroxy,3-methoxybenzalacetoacetate was prepared by the condensation of vanillin with acetoacetic ester, using piperidine as catalyst. The product was hydrogenated in the presence of platinized charcoal catalyst to ethyl α-3-methoxy, 4-hydroxybenzylacetoacetate.

The above ester was condensed with guanidine to form 2-amino-4-hydroxy-5-(3'-methoxy, 4'-hydroxybenzyl)-6-methylpyrimidine which was chlorinated and aminated as in the above examples, to give colorless crystals of 2,4-diamino-5-(3'-methoxy,4'-hydroxylbenzyl)-6-methylpyrimidine melting at 285–7 (dec.).

Similarly, veratric aldehyde was condensed with acetoacetic ester to form ethyl α-(3,4-dimethoxybenzal)acetoacetate which was reduced to the corresponding benzyl compound. After cyclization with guanidine, chlorination and amination as previously described, 2,4-diamino-5-(3',4'-dimethoxybenzyl)-6-methylpyrimidine was obtained.

EXAMPLE 11

2,4-diamino-5-(p-methoxybenzyl)-6-methylpyrimidine 2,4-diamino-5-(p-methoxybenzyl)-6-methylpyrimidine was prepared by the method of Example 5, melting at 231–4°.

In a similar manner, the preparation of additional compounds as enumerated below follows essentially the methods and techniques described in detail above:

1. 2,4 - diamino - 5-(2',4'- dibromobenzyl) - 6 - methylpyrimidine.
2. 2,4-diamino-5-(p-methoxybenzyl)-6 - ethylpyrimidine.
3. 2,4-diamino-5-(p- methylbenzyl)-6-methylpyrimidine.
4. 2,4-diamino -5-(p - chlorobenzyl) - 6 - ethylpyrimidine.
5. 2,4-diamino - 5 -(p-bromobenzyl) - 6 - ethylpyrimidine.
6. 2,4- diamino - 5 -(p - chlorobenzyl) - 6 - iso - propylpyrimidine.
7. 2,4- diamino - 5 -(p - bromobenzyl) - 6 - iso - propylpyrimidine.
8. 2,4-diamino-5-(p-bromobenzyl)-6-n-propylpyrimidine.
9. 2,4-diamino-5 -(m-methoxybenzyl)-6-methylprimidine.
10. 2,4-diamino-5-(o- methoxybenzyl)-6-methylpyrimidine.
11. 2,4- diamino-5-(o-bromobenzyl)-6-methylpyrimidine.
12. 2,4-diamino-5-(p-ethoxybenzyl)-6-methylpyrimidine.
13. 2,4 - diamino-5-(3',4'-dimethoxybenzyl)-6-propylpyrimidine.
14. 2,4- diamino-5-p-methoxybenzyl-6-propylpyrimidine.
15. 2,4 - diamino -5 -(3'- bromo - 4'- methoxy - benzyl)-6-methylpyrimidine.

We claim:
1. 2,4 - diamino - 5 -(3',4'- methylenedioxy - benzyl)-6-methylpyrimidine.
2. The method for the preparation of 5-benzyl-2,4-diamino-6-alkylpyrimidines which consists in the preparation of a hydrocinnamic ester having the group

at the α position, where R is an alkyl radical, condensing the latter with guanidine followed by chlorination and amination.

3. A method for the preparation of 5-benzyl-2,4-diamino-6-alkylpyrimidines which consists in the preparation of a hydrocinnamic ester having the group

at the α position, where R is an alkyl radical, condensing the latter with guanidine then successively chlorinating and aminating the product in a saturated alcoholic solution of ammonia to form the 5-benzyl-2,4-diamino-6-alkylpyrimidine.

GEORGE H. HITCHINGS.
ELVIRA A. FALCO.

REFERENCES CITED

The following references are of record in the file of this patent:

Kast, Berichte Deut. Chem., 45, 3135 (1912).